Dec. 6, 1927.

H. K. SWENEY

CONDUIT COUPLING

Filed May 27, 1926

1,652,064

Inventor
Harry K. Sweney.

By William C. Linton.
Attorney

Patented Dec. 6, 1927.

1,652,064

UNITED STATES PATENT OFFICE.

HARRY K. SWENEY, OF EVANSVILLE, WYOMING.

CONDUIT COUPLING.

Application filed May 27, 1926. Serial No. 112,074.

This invention relates to improvements in conduit couplings of that type or design as described and claimed in my earlier United States Patent Number 1,475,150, the invention having for an object to provide a coupling particularly advantageous for use in the joining of sections of metal, wood, cement or like plastic conduits, whereby a positive and fluid tight connection will be had between such sections permitting the same to be quickly and effectually connected by reason of the simple construction of the coupling and consequently thereupon, effecting a material saving in installation costs upon part of a user, as well as allowing the employment of unskilled labor for such installations.

It is an equally important object of the invention to provide a conduit coupling of a construction which will allow of relative adjustment between the joined sections, so that the sections will be permitted compensating adjustment to variations occurring in the bed or bottom of a ditch or trench receiving the same or to compensate for expansion and contraction, without in any way detracting from the efficiency of the joint.

It may be also stated to be among the aims and objects of the invention, to provide a conduit coupling of such construction as will permit of practical joining of conduit sections arranged at angles with respect to each other, as for example, in those instances wherein it becomes necessary to lay the sections in curved or irregular ditches or tranches.

Other objects of the invention will be in part obvious and in part pointed out hereinafter.

In order that the invention and its mode of operation may be readily understood by persons skilled in the art, I have in the accompanying illustrative drawings and in the detailed following description based thereupon, set out one possible embodiment of my invention:

Figure 1:
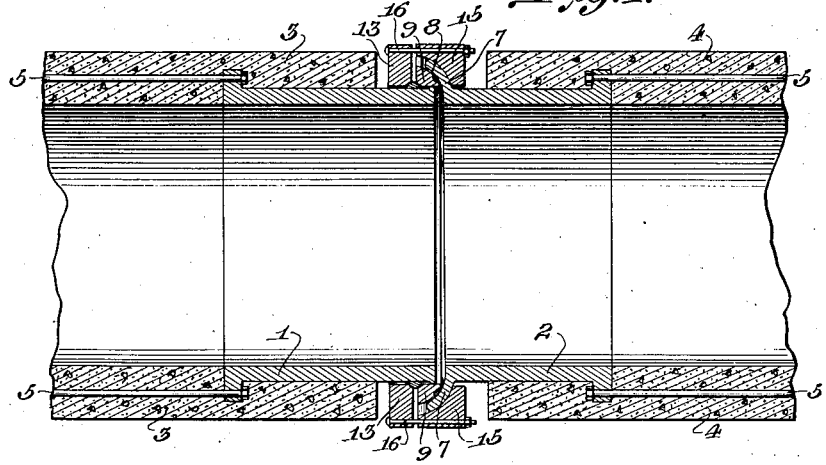
Fig. 1 is a sectional view through the adjacent ends of the conduit sections, having my improved coupling applied thereto.
Figure 2:
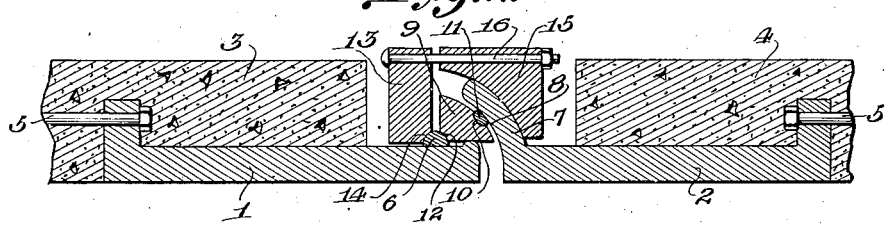
Fig. 2 is an enlarged detail section of the same.

Having more particular reference to the drawings in connection with which like characters of reference will designate corresponding parts throughout, the improved coupling may be stated to comprehend a pair of opposed collars or sleeves designated herein for convenience by the numerals 1 and 2, such sleeves being preferably formed of metal and having angularly disposed flanges 3 upon the opposite extremities thereof whereby to facilitate the positive embedding of said collars in cement or similar conduits designated by the numeral 4; anchoring rods or similar devices 5 being engaged with these flanges 3 and extending for distances into the conduits 4 whereby to effect positive or firm arrangement of said collars 1 and 2 therein. It is to be noted at this point that the outer or adjacent extremities of the opposed collars 1 and 2 are extended for distances beyond their respective adjacent marginal portions of the conduits 4, for a purpose which will be subsequently apparent.

In reduction of the invention to practice, it is preferable that two forms of the same be utilized, one form of the coupling being especially advantageous for usage with installation of conduits or culverts in curved or irregular ditches or trenches while the other form is particularly adapted for usage in ditches or trenches of a more regular character or formation. Therefore, in the subsequent description in point with these inventions, I shall refer, for clarity, to first, that form of the device for use in curved or irregular trenches and second, to that form of the invention more particularly adapted for installation in ditches or trenches of straight or regular formation.

That form of the invention as is disclosed in the Figure 1 has the peripheral portion of the inner extremity of the collar 1 "machined" or similarly prepared whereby to insure an absolutely smooth regular surface and there is engaged over this "machined" surface a soft metal packing or lead gasket 6 of substantially semi-circular cross sectional shape; said gasket 6 being spaced inwardly from the inner extremity or marginal portion of the collar 1.

The adjacent end of the coaxially opposed collar 2 is formed with an outwardly disposed or substantially bell like flange 7, whose cross sectional shape is semi-circular and of arrangement to overlappingly or telescopically receive the adjacent or inner extremity of the collar 1 therein, as is clearly shown in the Figure 1. A portion of the inner curved face of this bell like flange 7 is formed with an annular groove or way 8, the purpose of which will be subsequently described.

To effect a fluid tight jointure between the adjacent extremities of the collars 1 and 2 and especially, between the inner extremity of the collar 1 and the adjacent portions of the bell like flange 7 receiving the same, an annulus; arcuate in cross sectional configuration, designated by the numeral 9 is employed, said annulus being of a size which will insure its somewhat snug engagement over the peripheral portion of said inner extremity of the collar 1 and having a circumferentially disposed groove 10 formed on the curved surface thereof in a manner to coincide with the annular groove or way 8 formed upon the inner face of the aforesaid flange 7 whereby to permit of the reception of a suitable packing 11, preferably in form of a lead gasket, therein; it being noted in this connection, that the opposite portions of said gasket are received in the coinciding grooves or ways 8 and 10 and that by consequence, with the application of pressure or stress thereto, a fluid tight connection will result. Another groove or way 12 is formed upon the opposite side and inner portion of the annulus 9 and the configuration of this particular groove 12 is such as will insure of its snug engagement with the adjacent portion of the curved side of the packing 6, hereinbefore described. By reason of the engagement of the packing 6 in this groove 12, a further means is afforded the coupling for effecting a fluid tight jointure between the collars 1 and 2 thereof.

With a view toward providing the coupling with means for interconnecting the coaxially opposed extremities of the collars 1 and 2, I provide the device with a split locking ring 13, forming transversely of the outer portion of said ring a plurality of bolt receiving openings while upon the inner face and inner marginal portion of said locking ring there is formed a cross sectional semi-circular groove or way 14, which as will be noted, upon reference to the Figure 1, is adapted to snugly receive the adjacent curved portion of the gasket 6 therein. The width of this locking ring 13 is such as to permit the extension of the outer portion thereof for a distance beyond the outer extremities of the bell shaped flange 7 and that the ring may be clampingly connected to the oppositely disposed collar 2, I provide the device with another locking ring designated at this time by the numeral 15, said locking ring 15 having a substantially right angularly formed outer surface while the inner surface thereof is semi-circular in cross section whereby to conform to the general shape or contour of the adjacent or outer face of the bell shaped flange 7; thus, allowing said locking ring 15 to have overlapping engagement with the adjacent outer surface of the flange 7 while one extremity thereof is disposed in a direction toward the split locking ring 13. Transversely disposed bolt receiving openings are formed in the outer portion of this ring 15 and are adapted to be aligned with the corresponding bolt receiving openings in the split locking ring 13, whereby to permit of the passage or insertion of connecting bolts 16 through the several rings 13 and 15 so that the same may be positively and firmly interconnected and with adjustment of the nuts upon their respective bolts, to effect the application of stress to the intermediate parts of the coupling, namely, the bell shaped flange 7 and the annulus 9. Such application of pressure or stress to the parts 7 and 9 will, obviously, effect a positive engagement of the packings 6 and 11 in the adjacent ways or grooves 8, 10, 12 and 14, effecting the spreading of the packing or lead gaskets 6 and 11 to such an extent as to provide an effectual water tight jointure or connection as between the joined ends of the conduit couplings.

Because of the bell shaped formation of the flange 7 and its engagement with the curved adjacent surface of the annulus 9 as well as the engagement of the curved inner surface of the ring 15 with the adjacent outer surface of said flange 7, it will be understood that this particular form of conduit coupling may be advantageously used for the installation of conduit or culvert sections in curved or irregular ditches or trenches, wherein it becomes necessary to effect the arrangement of the joined conduit or culvert sections at angles with respect to each other. With this form of the invention, it will be appreciated that with laying of the conduits at the proper relative angles, the various parts of the coupling or joint may be then assembled and interconnected, whereupon a firm and fluid tight jointure will be afforded. Furthermore, it will be appreciated that with this novel form of jointure, the coupling will be permitted to have compensating adjustment with respect to the bed of a ditch or trench receiving the same, so that in event that "washouts" or similar irregularities occur, the coupling with "settling" onto the ditch or trench bed will in no way be detrimentally affected, but to the contrary, the construction of the coupling or joint will be such as to permit of slight relative compensating adjustment as between the collars 1 and 2 engaged in the adjacent ends of the conduit sections 3 and 4.

Figure 3:
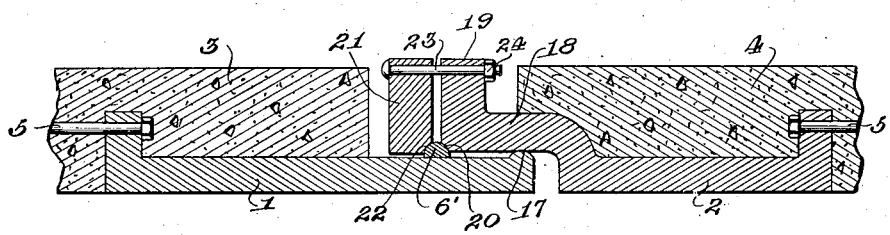
Fig. 3 is an enlarged detail section of a slightly modified form of the invention.
Figure 4:
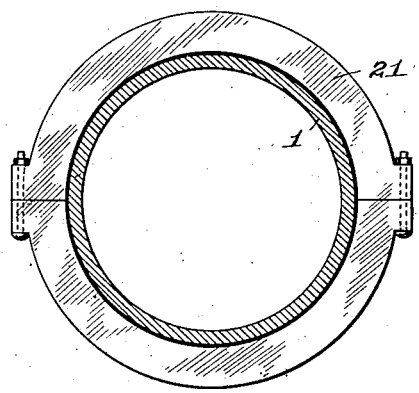
Fig. 4 is a transfer section through one of the collars of the coupling, showing a split locking ring used in connection therewith.

In that form of the invention as illustrated in Figure 3, the outer peripheral surface of the inner extremity of the collar 1 is "machined" or formed in the same manner as is the corresponding portion of the collar 1 shown in connection with the Figure 1 and there is received upon the said portion of this collar, a cross sectionally semi-circular packing or lead gasket 6', while upon the extreme inner extremity of said outer peripheral surface of this particular collar 1 a cross sectionally semi-circular lip 17 is formed.

The adjacent end of the coaxially disposed collar 2 is formed with a substantially bell-shaped annular flange 18, the outer marginal portion of which is provided with a substantially right angularly disposed flange 19, while a portion of the inner surface of said flange 18 is formed plane and is arranged to be in substantially parallelism to the adjacent portion of the outer peripheral surface of the collar 1. In this connection, it will be noted that the inner cross sectional area of the flange 18 is such as to snugly and overlappingly engage the adjacent extremity of the collar 1 and hence, to similarly engage over the outer portion of the cross sectionally semi-circular lip 17, aforesaid. The inner extremity and marginal portion of this flange 18 is formed with a cross sectionally semi-circular annular groove or way 20 adapted to snugly receive a portion of the adjacent side of the lead gasket 6' therein, when the adjacent end of the collar 1 is telescopically received in said flange 18.

To effect positive interconnection as between the collars 1 and 2 of this particular form of the invention, I provide a split locking ring 21, said ring having a cross sectionally semi-circular way or groove 22 formed upon the inner portion thereof as shown in the Figure 3 adapted to snugly engage with the adjacent side of the lead gasket 6', much after the mode of engagement of the opposite side of said gasket 6' in the annular groove or way 20. Connecting bolts or similar devices 23 are then passed through the outer portion of the split locking ring 21 and through corresponding openings formed in the flange 19, whereupon locking nuts or similar devices 24 are turned into engagement with the extended and screw threaded extremities of said bolts 23 so that with turning of the same onto such bolts, the flange 19 upon the bell shaped flange 18 and the split locking ring 21 will be drawn toward each other and thus, will have binding engagement upon the opposite side of the aforesaid lead gasket 6', causing said gasket to provide the coupling with an effectual fluid sealing jointure whereby to prevent the seepage or similar passage of fluid between the interconnected or telescopically engaged extremities of the collars 1 and 2.

By reason of the snug engagement of the bell shaped flange 18 over the annular lip 17 formed upon the inner extremity and outer peripheral portion of the collar 1, it will be understood that said collars 1 and 2 will be maintained in approximate coaxial alignment and thus, that the construction so produced will afford an effectual means for rigidifying the coupling at its point of jointure, that is, that jointure occurring between the adjacent ends of these collars 1 and 2. Consequently upon this, the said collars 1 and 2 will be prevented from having relative shifting or angular movement and therefore, the fluid tight characteristics of the jointure effected as between the said gasket 6' and the contacting surfaces of the collars 1 and 2 and the locking ring will be maintained.

This particular form of the improved conduit coupling will be found especially advantageous for use during installation of sectional conduits or culverts in straight or regular ditches or trenches and likewise, in ditches or trenches wherein no material irregularities will occur in the beds thereof upon which such conduits rest.

From the foregoing, it will be understood that I have provided a simple yet highly efficient form of conduit coupling which by reason of its construction will afford an effectual and durable jointure between conduit sections connected thereby. Furthermore, because of the simplicity of the construction, it will be understood that the same may be connected or installed by unskilled labor with but a minimum outlay of time and labor and by consequence, that a material saving will be effected upon part of a user of the device.

Manifestly, the construction shown is capable of considerable modification and such modification as is within the scope of my claims, I consider within the spirit of my invention.

I claim:

1. A conduit coupling comprising collars receivable in the adjacent ends of conduit sections, one of said collars having an outwardly disposed substantially bell shaped flange formed integral therewith, adapted to telescopically receive the adjacent end of the opposed collar therein, a soft metal gasket snugly received upon the outer peripheral portion of the adjacent end of said opposed collar, an annulus interposed between the inner face of said bell shaped flange and a portion of the outer peripheral surface of the adjacent end of said opposed collar, packing means interposed between the adjacent surfaces of said bell shaped flange and said annulus, one portion of said annulus having a circular way formed therein receiving a portion of said gasket therein, a split locking ring snugly engaged over the outer peripheral surface of the adjacent end of said opposed collar having a way formed therein receiving the adjacent side of said gasket therein, another locking ring having one surface thereof curved and arranged adjacent to the outer surface of said bell shaped flange, and means passing through the said locking rings for interconnecting the same and effecting the binding engagement of said soft metal gasket in the way of one of said locking rings and in the circular way of said annulus.

2. A conduit coupling comprising collars receivable and anchored in the adjacent ends of conduit sections, one of said collars having outwardly extending substantially bell shaped flange formed integral therewith adapted to telescopically receive the adjacent end of the opposed collar therein, the outer peripheral surface of the inner extremity of said opposed collar being formed smooth and regular, a soft metal gasket engaged completely about said smooth and regular peripheral portion of the opposed collar, an annulus of substantially triangular cross sectional shape received upon the outer peripheral portion of the adjacent end of the opposed collar having one side thereof curved to conform to the curvature of the inner face of said bell shaped flange, packing interposed between the curved and adjacent faces of said annulus and bell shaped flange, a portion of said annulus having a circular groove formed therein engageable with the adjacent side of said soft metal gasket, a locking ring overlappingly engaged with the outer surface of said bell shaped flange having that face of the same adjacent the flange curved to conform to the curvature of the outer face of such flange, a split locking ring snugly engaged over the outer peripheral surface of the adjacent end of the opposed collar having a circular way formed in an inner portion thereof engageable over the adjacent portion of said soft metal gasket, and means passing through said first and second mentioned rings for interconnecting the same and effecting binding engagement of said soft metal gasket in the ways, in said annular and split locking ring.

3. A conduit coupling comprising collars each having angularly disposed flanges formed with the outer ends thereof receivable in the adjacent ends of conduit sections projecting beyond the conduits and being of the same diameter, a cross sectionally semicircular bead formed with the extremity of the outer peripheral surface of the projecting inner end of one collar, a soft metal gasket spaced from said bead snugly and immovably received upon the projecting end of the last collar, a locking ring encircling said collar and having a greater interior diameter than the outer diameter of said collar, a substantially bell-shaped flange formed with and extending coaxially with the opposed collar, adapted to telescopically receive the projecting end of the other of said collars, and means connecting said ring and bell-shaped flange whereby said soft metal gasket will positively engage those surfaces contacting therewith.

4. A conduit coupling comprising a pair of collars receivable in the adjacent ends of the conduit sections, the inner ends of said collars projecting beyond the conduits, a bead formed with the extremity of the inner end of one of said collars, a gasket encircling the last said collar and spaced from said bead, an annulus slidable longitudinally upon said bead and engaging said gasket, a locking ring engaging said gasket and means connecting the opposed collar with said ring whereby said gasket will positively engage those surfaces contacting therewith.

In witness whereof I have hereunto set my hand.

HARRY K. SWENEY.